United States Patent
Song et al.

[11] Patent Number: 5,827,572
[45] Date of Patent: Oct. 27, 1998

[54] PROCESS FOR MANUFACTURE OF A ZIRCONIA MATERIAL RESISTANT TO LOW TEMPERATURE DEGRADATION

[75] Inventors: Huesup Song; Gyeungho Kim; Doh-Yeon Kim; Tai-Joo Chung, all of Seoul, Rep. of Korea

[73] Assignee: Korea Institute of Science & Technology, Seoul, Rep. of Korea

[21] Appl. No.: 641,190

[22] Filed: Apr. 30, 1996

[30] Foreign Application Priority Data

Oct. 17, 1995 [KR] Rep. of Korea ................ 1995/35818

[51] Int. Cl.$^6$ ................ C23C 16/02; C23C 16/30; C04B 35/48
[52] U.S. Cl. ................ 427/255.4; 427/399; 501/103; 501/104; 501/105; 501/152
[58] Field of Search ................ 501/103, 104, 501/105, 152; 427/255.4, 399

[56] References Cited

U.S. PATENT DOCUMENTS

| | | | |
|---|---|---|---|
| 4,282,270 | 8/1981 | Nozaki et al. | 427/255.4 |
| 4,525,464 | 6/1985 | Claussen et al. | 501/103 |
| 4,640,902 | 2/1987 | Lange | 501/97 |
| 4,820,666 | 4/1989 | Hirano et al. | 501/104 |
| 5,196,285 | 3/1993 | Suzuki et al. | 501/87 |
| 5,358,913 | 10/1994 | Chatterjee et al. | 501/103 |
| 5,443,662 | 8/1995 | Arai et al. | 427/255.4 |
| 5,525,560 | 6/1996 | Yamazaki et al. | 501/103 |

OTHER PUBLICATIONS

S. Lawson, "Environmental Degradation of Zirconia Ceramics", Journal of European Ceramic Society, 15 (1995) 485–502. No month.

Garvie et al., *J. A. Ceramic Soc.* 55(6):303–305 (1972), Jun.

Winnubst et al., *Advances in Ceramics* 24:39–47 (1988). No month.

MTL–STD–1942(MR), Nov. 21, 1983.

*Primary Examiner*—Mark L. Bell
*Assistant Examiner*—Louis M. Troilo
*Attorney, Agent, or Firm*—Scully, Scott, Murphy & Presser

[57] ABSTRACT

A zirconia material resistant to low temperature degradation and process for manufacturing thereof includes heat treating zirconia material or zirconia composite material at 1200°–1700° C. in the presence of nitrogen source.

6 Claims, No Drawings

PROCESS FOR MANUFACTURE OF A ZIRCONIA MATERIAL RESISTANT TO LOW TEMPERATURE DEGRADATION

BACKGROUND OF THE INVENTION

1. Field of the Invention

The present invention relates to zirconia material or zirconia composite material having high strength and high toughness by inhibiting the low temperature degradation behavior thereof, and process for manufacturing thereof. More specifically, the present invention relates to zirconia material wherein a surface layer for inhibiting low temperature degradation has been formed on a zirconia having high strength and high toughness, so that the low temperature degradation behavior, which deteriorate the mechanical property owing to the phase transformation from tetragonal system to monoclinic system when exposed to a temperature of 100°–500° C., is inhibited, and a process for manufacturing thereof.

2. Description of the Conventional Art

Under ambient pressure, zirconia has three polymorphic forms of monoclinic, tetragonal and cubic system. In case of pure zirconia, when cooled from high temperature, it has been known that cubic(c) is stable in the range from the melting point of zirconia to about 2370° C.; tetragonal(t) is stable in the range from about 2370° C. to about 1120° C.; and monoclinic(m) is stable in the temperature range below about 1120° C. Among these, the phase transformation from tetragonal to monoclinic is a destructive phase transformation accompanying 3–5% of volume expansion and about 8% of shear displacement, and thus a great deal of cracks may occur upon sintering and cooling the pure zirconia.

However, if a stabilizer such as MgO, CaO, $Y_2O_3$, $CeO_2$ and $TiO_2$ is added to zirconia, a material of transformable tetragonal (here-in-after, referred to as $t-ZrO_2$), non-transformable tetragonal (here-in-after, referred to as $t'-ZrO_2$), cubic or mixture thereof, or an admixture thereof with monoclinic can be easily manufactured even at room temperature dependent upon the amount added and manufacturing conditions.

Ceramics comprising tetragonal $ZrO_2$, as a transformation-toughened ceramics using stress-induced phase transformation of zirconia, can improve the strength and toughness of the ceramics, whereby they are widely used for structural material where high strength and high toughness are required. The stress-induced phase transformation refers to a phenomenon where a tetragonal zirconia existing as meta-stable phase at room temperature absorbs energy by transforming into a monoclinic phase driven by the shear stress at the crack front, and such phase transformation is known as martensitic transformation that does not require a diffusion process.

The toughened ceramics using the stress-induced phase transformation as described above includes partially stabilized zirconia (PSZ) prepared by adding a stabilizer such as Mgo, CaO and $Y_2O_3$ to zirconia to form a cubic and then heat treating thereof to precipitate fine tetragonal particles; tetragonal zirconia polycrystals (TZP) in which all particles are tetragonal, prepared by adding 2–3 mol % of $Y_2O_3$ or 10–12 mol % of $CeO_2$ to zirconia and sintering at a condition where the tetragonal phase is stable; zirconia polycrystals prepared by adding a toughening material such as $Ta_2O_5$, $Nb_2O_5$ and $MoO_3$ to the TZP mentioned above; and zirconia toughened ceramics (ZTC) prepared by dispersing tetragonal zirconia to other ceramics such as alumina, etc.

However, if these transformation-toughened ceramics are exposed at a temperature range of 100° to 500° C. for a long time, $t-ZrO_2$ spontaneously transforms starting from the surface to monoclinic to cause cracks, thereby lowering the mechanical property. Thus, the use of TZP, or a composite material comprising a substantial amount of TZP at a temperature range of 100°–500° C. is practically restricted. Though the mechanism for the transformation of $t-ZrO_2$ into monoclinic at a temperature range of 100°–500° C. has not yet elucidated, it is generally known that the transformation readily occurs in materials in which $t-ZrO_2$ can readily transforms to monoclinic by a stress, i.e., materials comprising $t-ZrO_2$ of large grain size or high-toughness materials. In addition, it is known that the transformation of $t-ZrO_2$ to monoclinic is accelerated in the presence of moisture or polar solvents.

In order to prevent or to reduce the low temperature (about 100°–500° C.) phase transformation and deterioration of mechanical property of TZP or the materials comprising substantial amount of TZP, disclosed are a process by reducing the grain size of $t-ZrO_2$ to inhibit the transformation to monoclinic; a process by increasing the amount of stabilizer on the surface layer; and process by preparing a composite material using additives.

In order for the zirconia containing a certain amount of stabilizer to exist as tetragonal phase at room temperature, the grain size should be smaller than the critical size. It is found that $t-ZrO_2$ having a grain size smaller than the critical size is not transformed to monoclinic, when the zirconia comprising a certain amount of stabilizer is exposed at a low temperature range for a long time [Advances in Ceramics, Vol. 24, 39–48(1988)].

U.S. Pat. No. 4,820,666 suggested a process for preventing low temperature degradation by preparing a composite material by mixing zirconia with oxides such as $Al_2O_3$, MgO and spinel. In this case, one or more stabilizer or additives forming a solid solution may be used. However, the application of this process is restricted because the composition of the material should be altered.

According to U.S. Pat. No. 4,525,464, the low temperature degradation is prevented by forming a surface layer having higher content by 2–20 mol % of the stabilizer than that of internal part by using a powder bed of stabilizer on a surface of the green body or sintered product of zirconia or zirconia composite material comprising a stabilizer such as MgO, CaO, $Y_2O_3$, $CeO_2$. However, this process has a disadvantage in that a powder comprising the same stabilizer as used in the zirconia or the composite material thereof should be used as the powder bed in forming the surface layer, and that the contact of the powder bed with the material is essential because the surface layer is formed by solid diffusion. Further, it is disadvantageous in that highly porous layer may be formed on the surface in case of heat treating the green compact, and that a long time heat treatment should be performed owing to the low diffusion coefficient of the cations in zirconia in case of heat treating the dense sintered product, whereby the grain growth of inner sintered body may be unavoidable, consequently lowering the mechanical properties of zirconia.

SUMMARY OF THE INVENTION

The object of the present invention is to provide a TZP, zirconia material comprising TZP, or zirconia composite material wherein the surface layer of the material comprises nitrogen as a solid solution, and the surface layer is more stabilized than the internal material.

Another object of the present invention is to provide a process for manufacturing zirconia material resistant to low temperature degradation comprising heat treating TZP or a zirconia composite material containing TZP.

Nitrogen functions as a stabilizer in the present invention, and nitrogen gas or compounds containing nitrogen is used as a nitrogen source. According to the present invention, a surface layer, which is more stable against the phase transformation than internal part of the material, is formed.

DETAILED DESCRIPTION OF THE INVENTION

The process according to the present invention is described in more detail.

The process comprises heat treating a sintered product of zirconia or zirconia composite material at 1200°–1700° C. under nitrogen atmosphere; or a nitrogen compound is supplied to the surface of the sintered product of the material and then the resultant product is heat treated at 1200°–1700° C. under the atmosphere of nitrogen or an inert gas.

The minimum limits of the temperature and duration of the heat treatment are those value which can form a minimum surface layer stabilized compared to the internal part, which can inhibit the low temperature degradation by homogeneously distributing nitrogen to the grains on the surface. On the other hand, the maximum limits are those value which can result the deterioration of the mechanical properties owing to the grain growth of the material or to the excessive thickening of the surface layer. The duration of the heat treatment is selected in the range between several minutes and several hours dependent upon the heat treating temperature. In general, the minimum thickness of the surface layer is several microns, while the maximum thickness is several hundred microns.

The method for applying the nitrogen source is not restricted, and it is unnecessary for the source to directly contact to the material. Nitrogen source may be supplied as nitrogen gas, for example. In order to increase the contact area of the material with the nitrogen compound, the sintered product may be buried under the powder containing the nitrogen compound, and then optionally pressed under a mild pressure. The sintered product may be immersed in a slurry containing the nitrogen compound, or the slurry may be sprayed on the sintered product to be coated on the surface of the product.

The nitrogen compounds which can be used in the present invention include nitrogen compounds containing elements of group 2A, 3B, 4A, 4B, 5A or 6A as well as nitrogen. Among these, ZrN is particularly preferable. These nitrogen compounds may be used alone or as a mixture of two or more compounds, or used, if required, together with other compounds.

In the surface layer of the material prepared as mentioned above, zirconia exists as transformable tetragonal ($t$-$ZrO_2$), non-transformable tetragonal ($t'$-$ZrO_2$), cubic, mixtures thereof, or the mixture thereof with monoclinic, which exhibits higher stability than the material prior to the nitridation. The surface layer exhibits an inhibited degradation if it is exposed at 100°–500° C. for a long time as compared to the original material prior to the nitridation.

The materials to which the process of the present invention is applicable include zirconia materials having low temperature degradation behavior including $t$-$ZrO_2$, for example, partially stabilized zirconia (PSZ), tetragonal zirconia polycrystals (TZP), and zirconia toughened ceramics (ZTC) prepared by dispersing zirconia to other ceramics in tetragonal phase, etc. According to the present invention, low temperature degradation can be prevented by simply forming a surface layer independent on the type of the material, so that the process may be used per se to the sintered product prepared in various composition. Thus, the materials containing zirconia to which the process of the invention is applicable are not particularly restricted.

The nitrogen source used as a stabilizer in the present invention may be provided as a gas phase as well as solid or slurry, whereby the materials to which a surface layer is formed according to the present invention are not restricted by the porosity of the materials. Thus, if nitrogen gas is used as a nitrogen source, the nitrogen source can be reached to the inner surface, so that a stable surface layer can be formed according to the present invention to a material having high porosity.

In general, the diffusion rate of cations is slower than that of anions in zirconia, and it is possible to form a surface layer of nitrogen as an anion while minimizing or preventing the diffusion of cations in the nitrogen compounds. As compared to the case of using a cation as a stabilizer, the surface layer can be formed in a short time at the same temperature.

DETAILED DESCRIPTION OF THE PREFERRED EMBODIMENT

The present invention is described in more detail by referring to the Examples here-in-below, however, it should be noted that the present invention is not limited to these Examples.

In the Examples, strength of the samples is measured in accordance of US MIL-STD-1942 by three-point bending method with 20 mm span using samples having a dimension of 1.5 mm×2 mm×25 mm. In the phase analysis of the samples, the content of monoclinic was determined from the monoclinic peak($-111$), (111) and tetragonal and cubic (111) peak by using the method described in J. Am. Ceram. Soc. 55[6] 303–305 (1972).

Most of the thickness of the surface nitrided surface was measured by optical microscopy, and the thickness of the construction, where the transformable tetragonal zirconia has been transformed to non-transformable tetragonal or cubic, or the mixture thereof so that the grain growth largely occurred compared to the internal part, is measured. In case of the thickness of the surface nitrided layer being less than 10 microns, the thickness was measured by using a scanning electron microscopy as it was difficult to be measured by an optical microscopy.

EXAMPLE 1

$ZrO_2$ powder containing 2 mol % of $Y_2O_3$ pressed at 14 MPa to form a green compact, and pressed at 150 MPa by cold isostatic pressing. The material was sintered at 1600° C. for 3 hours in air in a high temperature sintering furnace to obtain a sintered body having relative density of 99% or more and grain size of about 0.8 μm. only trace amount of monoclinic phase was confirmed by X-ray diffraction. The sintered body was buried in ZrN powder with tapping. The sintered body was buried in ZrN powder with tapping. The resultant material was charged in a graphite furnace, and heated under nitrogen atmosphere with flowing 150 cc/min of nitrogen at a pressure of 0.15 MPa, to form a nitrided surface layer under the condition listed in Table 1 below. The content of monoclinic phase in the surface and flexural strength of each sample was measured, and the thickness of the nitrided surface layer was measured by using an optical microscopy (see Table 1).

Each sintered product to which surface nitrided layer has been formed was low temperature degraded at 200° C. for 100 hours in air, and the monoclinic content was measured (see Table 1). An as-sintered product was used as a comparison sample.

TABLE 1

2 mol % $Y_2O_3$—$ZrO_2$ nitrided with ZrN powder and $N_2$ gas

| Surface nitridation condition (°C./h) | Thickness of surface layer (μm) | Monoclinic content (%) | Low temperature degradation condition (°C./h) | Monoclinic content (%) |
|---|---|---|---|---|
| Sintered product prior to nitridation | — | <3 | 200/100 | 92 |
| A) 1300/0.5 | <10 | 3 | 200/100 | 43 |
| B) 1300/2.0 | <10 | 7 | 200/100 | 12 |
| C) 1400/0.5 | <10 | 9 | 200/100 | 18 |
| D) 1400/2 | 215 | <3 | 200/100 | <3 |
| E) 1500/0.5 | 215 | <3 | 200/100 | <3 |
| F) 1600/0.5 | 350 | <3 | 200/100 | <3 |
| G) 1700/0.5 | 446 | <3 | 200/100 | <3 |

EXAMPLE 2

A sintered product was prepared in accordance of Example 1 but the content of $Y_2O_3$ as a stabilizer was 3 mol %. The sintered product contained less than 3% of monoclinic crystal, and had 99% or more of relative density and about 0.7 μm of mean grain size. A 3 mol % $Y_2O_3$-$ZrO_2$ sintered product was buried in ZrN powder and charged in a graphite furnace, and then a surface nitrided layer was formed under the nitrogen atmosphere as described in Example 1 and the conditions listed in Table 2. The low temperature degradation behavior of the product obtained was examined. After the low temperature degradation at 200° C. for 400 hours, the content of monoclinic phase was increased to about 70% for sintered product. Flexural strength was 956 MPa, and the sintered product was badly cracked after the low temperature degradation.

TABLE 2

3 mol % $Y_2O_3$—$ZrO_2$ nitrided with ZrN powder and $N_2$ gas

| Surface nitridation condition (°C./h) | Thickness of surface layer (μm) | Content of monoclinic phase (%) | Flexural strength (MPa) |
|---|---|---|---|
| Sintered product prior to nitridation | — | <3 | 956 |
| 1300/0.5 | <10 | 3 | — |
| 1300/2.0 | <10 | 5 | — |
| 1400/0.5 | <10 | 6 | — |
| 1500/0.5 | 200 | 8 | 799 |
| 1600/0.5 | 330 | 9 | — |

| Surface nitridation condition (°C./h) | Low temperature degradation condition (°C./h) | Content of monoclinic phase (%) | Flexural strength (MPa) |
|---|---|---|---|
| Sintered product prior to nitridation | 200/400 | 70 | 0 |
| 1300/0.5 | 200/100 | 40 | — |
| 1300/2.0 | 200/100 | 8 | — |
| 1400/0.5 | 200/100 | 11 | — |

TABLE 2-continued 3 mol % $Y_2O_3$—$ZrO_2$ nitrided with ZrN powder and $N_2$ gas

| 1500/0.5 | 200/400 | 8 | 719 |
| 1600/0.5 | 200/400 | 9 | — |

EXAMPLE 3

A 3 mol % $Y_2O_3$-$ZrO_2$ sample was sintered in a condition identical to that of Example 1. A surface nitrided layer was formed under nitrogen atmosphere as described in Example 1 and conditions listed in Table 3, and the low temperature degradation behavior was examined.

TABLE 3

3 mol % $Y_2O_3$—$ZrO_2$ nitrided with $N_2$ gas

| Surface nitridation condition (°C./h) | Thickness of surface layer (μm) | Content of monoclinic phase (%) | Flexural strength (MPa) |
|---|---|---|---|
| Sintered product prior to nitridation | — | <3 | — |
| 1500/2 | <10 | <3 | — |
| 1600/2 | 90 | <3 | 686 |
| 1700/2 | 200 | <3 | — |

| Surface nitridation condition (°C./h) | Low temperature degradation condition (°C./h) | Content of monoclinic phase (%) | Flexural strength (MPa) |
|---|---|---|---|
| Sintered product prior to nitridation | 200/20 | 65 | — |
| 1500/2 | 200/20 | 35 | — |
| 1600/2 | 200/400 | <3 | 656 |
| 1700/2 | 200/400 | <3 | — |

EXAMPLE 4

$ZrO_2$ powder containing 2 mol % of $Y_2O_3$ was pressed at 14 MPa to form a green compact, and pressed at 150 MPa by cold isostatic pressing. The material was sintered at 1450° C. for 3 hours in air in a high temperature sintering furnace. The sintered body was buried in ZrN powder with tapping. The resultant material was nitrided by charging the material in a graphite furnace and heating it under nitrogen atmosphere with flowing 150 cc/min of nitrogen at a pressure of 0.15 MPa to form a nitrided surface layer thereon.

Another sintered body was also nitrided by heating the body with flowing $N_2$ at a rate of 150 cc/min at a pressure of 0.15 MPa without burying in ZrN powder.

For each sample, low temperature degradation test was carried out at 180° C. for 10 hours in autoclave, and flexural strength was measured (see Table 4). Equilibrium water vapor pressure was 1 MPa. An as-sintered product was used as a comparison sample.

Flexural strength of the comparison samples and nitrided samples was measured before and after low temperature degradation treatment.

The thickness of the nitrided surface layer was measured by using an optical microscopy.

TABLE 4

Flexural strength of nitrided 2 mol % $Y_2O_3$—$ZrO_2$

| Surface nitridation condition | | Thickness of surface layer ($\mu$m) | Flexural strength before low temp. deg. (MPa) | Flexural strength after low temp. deg. (MPa) |
|---|---|---|---|---|
| Sintered at 1450° C., 3 hrs. | no nitridation | — | 1251 | 420 |
| | ZrN + $N_2$ (1400° C., 1 hr) | <5 | 1148 | 1114 |
| | $N_2$ (1400° C., 1 hr) | <5 | 1303 | 987 |
| | ZrN + $N_2$ (1600° C., 1 hr) | <5 | 822 | 899 |
| | $N_2$ (1600° C., 1 hr) | <5 | 886 | 849 |
| Sintered at 1600° C., 3 hrs. | no nitridation | — | 1176 | 768 |
| | ZrN + $N_2$ (1400° C., 1 hr) | 242 | 1151 | 1086 |
| | $N_2$ (1400° C., 1 hr) | <5 | 1162 | 1166 |
| | ZrN + $N_2$ (1600° C., 1 hr) | 338 | 801 | 808 |
| | $N_2$ (1600° C., 1 hr) | 12 | 651 | 672 |

EXAMPLE 5

Except for using 3 mol % $Y_2O_3$-$ZrO_2$ instead of 2 mol % $Y_2O_3$-$ZrO_2$, nitridized product was prepared in accordance of Example 4, and thickness of surface layer and flexural strength were also measured in accordance of Example 4. The results are shown in Table 5.

TABLE 5

Flexural strength of nitrided 3 mol % $Y_2O_3$—$ZrO_2$

| Surface nitridation condition | | Thickness of surface layer ($\mu$m) | Flexural strength before low temp. deg. (MPa) | Flexural strength after low temp. deg. (MPa) |
|---|---|---|---|---|
| Sintered at 1450° C., 3 hrs. | no nitridation | — | 968 | 549 |
| | ZrN + $N_2$ (1400° C., 1 hr) | <5 | 864 | 969 |
| | $N_2$ (1400° C., 1 hr) | <5 | 940 | 870 |
| | ZrN + $N_2$ (1600° C., 1 hr) | 500 | 549 | 684 |
| | $N_2$ (1600° C., 1 hr) | 38 | 537 | 561 |

EXAMPLE 6

$Al_2O_3$ powder containing with 30 vol % of $ZrO_2$ was molded as described in Example 1, and sintered at 1600° C. for 3 hours to prepare an oxide-TZP composite material. The content of monoclinic phase of zirconia contained in the sintered product was 4%, and the content was increased to 26% after the low temperature degradation at 200° C. for 50 hours in air. A surface nitrided layer was formed by heating at 1600° C. for 1 hour according to the process of Example 1 by using ZrN powder. Nitrided layer having thickness of 60 $\mu$m was formed and monoclinic phase was not detected. After the low temperature degradation of the sample at 200° C. for 50 hours, monoclinic phase did not exist.

$ZrO_2$ powder added with 20 vol % of $Al_2O_3$ was molded as described in Example 1, and sintered at 1550° C. for 2 hours to prepare an oxide-TZP composite material. The content of monoclinic phase of zirconia contained the sintered product was 14%, and the content was increased to 52% after the low temperature degradation at 200° C. for 50 hours. A surface nitrided layer was formed by heating at 1600° C. for 1 hour according to the process of Example 1 by using ZrN powder. Nitrided layer having thickness of 60 $\mu$m was formed and monoclinic phase was not detected. After the low temperature degradation of the sample at 200° C. for 50 hours, monoclinic phase did not exist.

EXAMPLE 7

The powder in the same as Example 1 was molded by the same process, and sintered at 1450° C. for 3 hours. In the sintered product monoclinic phase did not exist, and the content of monoclinic phase was increased to 94% after the low temperature degradation at 200° C. for 100 hours. A surface nitrided layer was formed by varying the type of the nitrogen compound. The sintered product was buried in each nitrogen compound powder as described in Example 1, and then a surface nitrided layer was formed by heating at 1600° C. for 1 hour under nitrogen atmosphere as described in Example 1. The type of nitrogen compound used, thickness of the nitrided layer and the content of monoclinic phase are shown in Table 6 below.

TABLE 6

Thickness of nitrided surface and content of monoclinic phase depending on the type of nitrogen compound

| Nitrogen compound | Thickness of surface layer ($\mu$m) | Content of monoclinic phase (%) | Low temp. degradation condition (°C./h) | Content of monoclinic phase (%) |
|---|---|---|---|---|
| ZrN | 230 | 2 | 200/50 | 0 |
| BN | 10 | 0 | 200/50 | 5 |
| AlN | 215 | 0 | 200/50 | 2 |
| $Si_3N_4$ | 77 | 12 | 200/50 | 0 |
| TiN | 2 | 0 | 200/50 | 6 |
| $Mg_3N_2$ | 5 | 0 | 200/50 | 0 |

EXAMPLE 8

After preparing the sintered product having the same composition as Example 1, and the product was deposited with a slurry prepared by adding 20 vol % of ZrN powder and 1.5 wt % of copolymeric stearic dispersant to a mixed solvent (1:1) of alcohol and acetone, to coat the surface with the slurry. A surface nitrided layer having thickness of 150 $\mu$m was formed by heating at 1500° C. for 1 hour under nitrogen atmosphere as described in Example 1. Monoclinic phase was not detected in the surface nitrided layer. After the low temperature degradation of the sample at 200° C. for 50 hours, monoclinic phase was not detected.

EXAMPLE 9

A sintered product was prepared according to Example 1, and it was buried in ZrN powder. Surface nitridation was performed by heating at 1500° C. for 1.5 hours with flowing 150 cc/min of argon at a pressure of 0.15 MPa. A surface nitrided layer having thickness of 250 $\mu$m was formed, and the content of monoclinic phase was less than 3%. After performing low temperature degradation at 200° C. for 100 hours, the content of monoclinic phase did not increase. The results are shown in Table 7.

TABLE 7

3 mol % $Y_2O_3$—$ZrO_2$ nitrided with Ar gas

| Surface nitridation condition (°C./h) | Thickness of surface layer (μm) | Content of monoclinic phase (%) | Low temp. degradation condition (°C./h) | Content of monoclinic phase (%) |
|---|---|---|---|---|
| Sintered product prior to nitridation | — | <3 | 200/100 | 70 |
| 1500/1.5 | 250 | <3 | 200/100 | <3 |

What is claimed is:

1. A process for forming a surface layer on zirconia to prevent low temperature degradation compared to the internal material, which comprises heat treating a sintered zirconia material or a sintered zirconia composite at 1200°–1700° C. under a nitrogen atmosphere.

2. A process according to claim 1, wherein the process comprises supplying a nitrogen compound or a complex of a nitrogen compound with other element on the surface of the sintered material, and heat treating thereof under nitrogen or inert atmosphere.

3. A process according to claim 1, wherein the process comprises supplying a slurry containing nitrogen compound and heat treating under nitrogen or inert atmosphere.

4. A process according to claim 1 or 2, wherein the nitrogen compound contains elements selected from group 2A, 3B, 4A, 4B, 5A and 6A of the Periodic Table as well as nitrogen.

5. A process according to claim 4, wherein the nitrogen compound is selected from a group consisting of ZrN, $Si_3N_4$, $Mg_3N_2$, AlN, TiN, BN and NbN.

6. A process for forming a surface layer to prevent low temperature degradation compared to an internal material containing zirconia or a zirconia composite, said process comprising the steps of supplying nitrogen gas or a nitrogen compound on a surface of sintered zirconia or sintered zirconia composite and heat treating under an atmosphere of inert gas or nitrogen gas.

* * * * *

UNITED STATES PATENT AND TRADEMARK OFFICE
CERTIFICATE OF CORRECTION

PATENT NO. : 5,827,572
DATED : October 27, 1998
INVENTOR(S) : Huesup Song, et al.

It is certified that error appears in the above-identified patent and that said Letters Patent are hereby corrected as shown below:

On the Title Page, Section [56], Column 2, line 4:

"5,196,285" should read --5,196,385--

On the Title Page, Section [56], under "OTHER PUBLICATIONS", line 7:

"MTL" should read --MIL--

Signed and Sealed this

Third Day of October, 2000

*Attest:*

Q. TODD DICKINSON

*Attesting Officer*   Director of Patents and Trademarks